Figure 1:
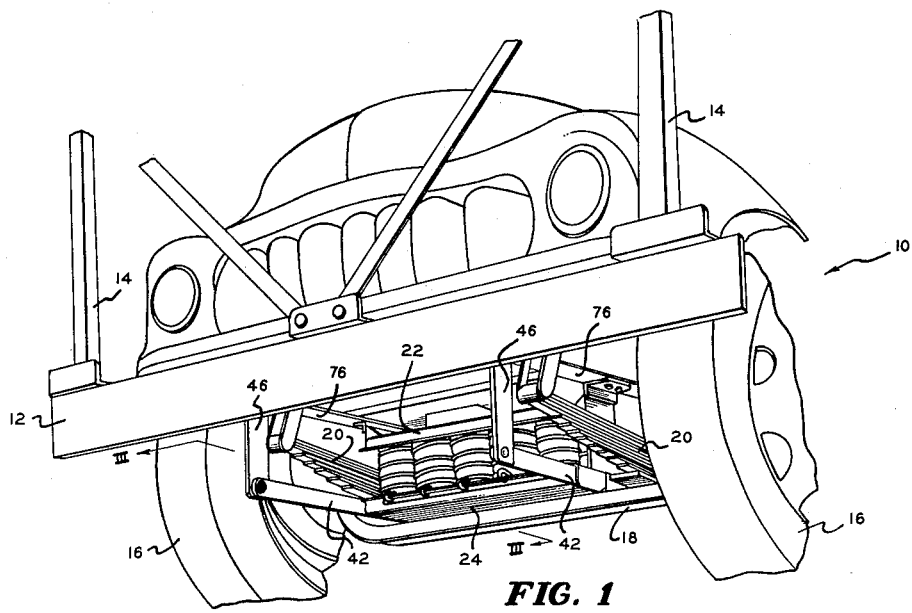

July 7, 1964 M. F. PAUL 3,140,083
AUXILIARY VEHICLE AIR SPRING
Filed Jan. 23, 1962 2 Sheets-Sheet 1

INVENTOR
*MAHRLE F. PAUL*

BY *Beaman & Beaman*

ATTORNEY

July 7, 1964  M. F. PAUL  3,140,083
AUXILIARY VEHICLE AIR SPRING
Filed Jan. 23, 1962  2 Sheets-Sheet 2

INVENTOR
MAHRLE F. PAUL
BY Beaman & Beaman
ATTORNEY

United States Patent Office 3,140,083
Patented July 7, 1964

3,140,083
AUXILIARY VEHICLE AIR SPRING
Mahrle Fredrick Paul, Michigan Center, Mich., assignor to Pasco Air-Aid, Inc., Cleveland, Ohio, a corporation of Ohio
Filed Jan. 23, 1962, Ser. No. 168,078
7 Claims. (Cl. 267—15)

The invention pertains to a auxiliary spring for vehicles and particularly relates to a supplemental air spring for heavily loaded vehicles for improving the riding, shock-absorbing, and steering characteristics thereof.

Auxiliary springs for vehicles are well known in the truck and automobile art whereby such auxiliary springing is employed to aid the conventional vehicle suspension. Such auxiliary springs are normally employed with the rear axle of a truck or automobile in that the highest loads are usually imposed upon the rear portion of the vehicle. The invention pertains to an auxiliary vehicle spring unit which may be associated with either the rear or front axle of a vehicle, and particularly finds application with the front axle of heavy duty trucks.

The installation of auxiliary or overload springs in heavy duty trucks is often difficult due to the necessity of substantial modification to the vehicle understructure to provide sufficient clearance for the auxiliary spring devices. In the past, the problem of providing adequate clearance between the vehicle axle and frame has made it most difficult to provide suitable auxiliary springing for the front end of vehicles. The invention overcomes many of the problems heretofore encountered in the installation of auxiliary spring apparatus in that simplified and substantially universal mounting means are employed for attaching the apparatus to the vehicle and the positioning of the auxiliary spring apparatus is such that the heretofore known clearance and space problems are overcome.

A further object of the invention is to provide an auxiliary vehicle air spring unit which is of an economical and readily manufacturable form which may be easily installed and requires only little modification of the vehicle.

A further object of the invention is to provide an auxiliary vehicle air spring apparatus which is readily adaptable to a wide variety of vehicle makes and may be installed without special equipment or extraordinary skill.

A further object of the invention is to provide an auxiliary vehicle air spring unit employing inflatable bag members wherein a low air pressure will provide the desired springing action and a plurality of inflatable members are controlled from a single air valve.

Figure 2:
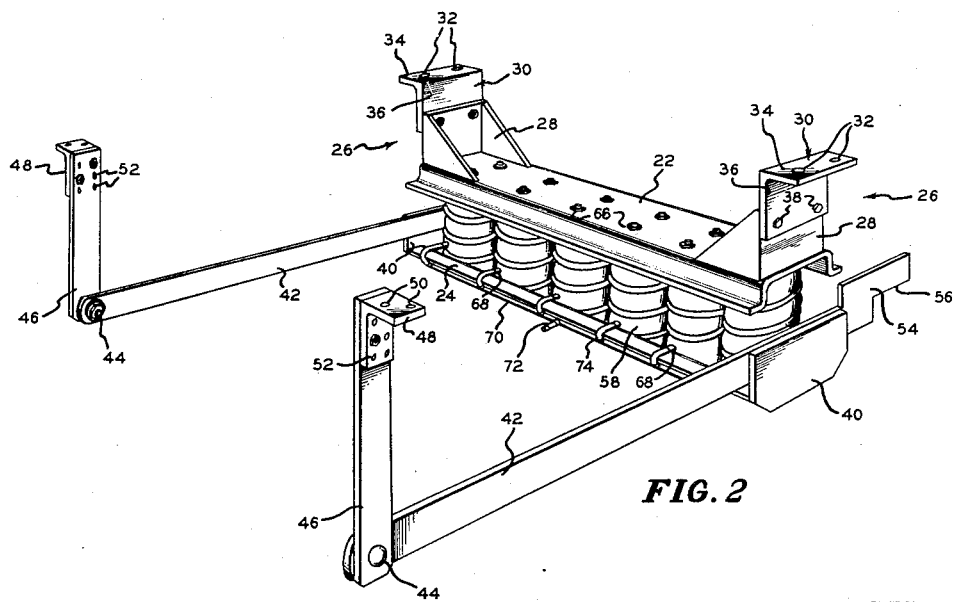
Figure 3:
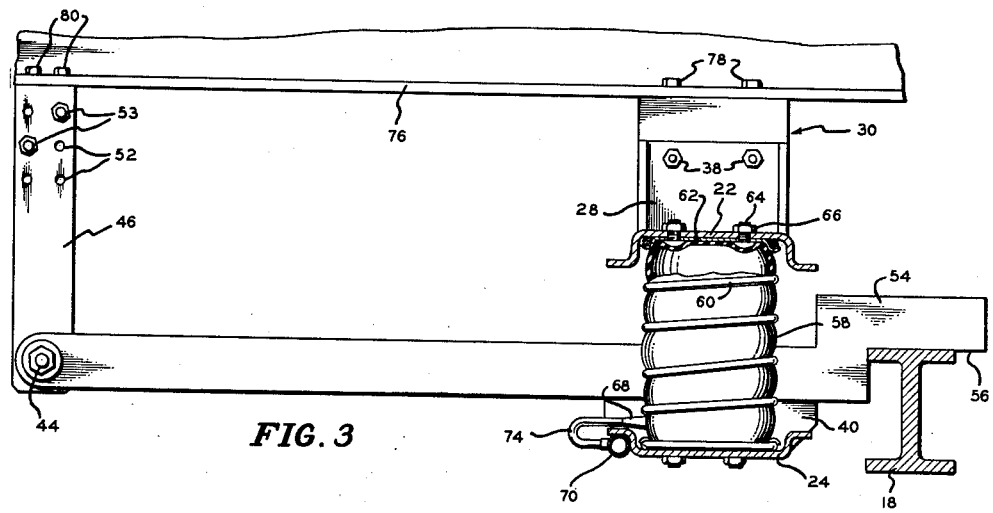
Figure 4:
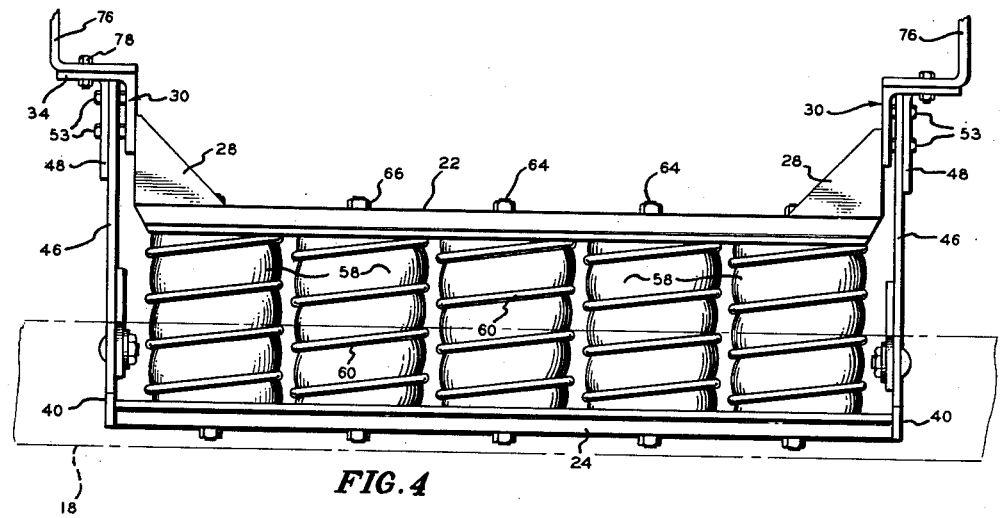

These and other objects of the invention arising from the details of the components and the relationships thereof of an embodiment will be apparent from the following description and accompanying drawings wherein:

FIG. 1 is a front, underside, perspective view of a truck employing air spring apparatus with a front axle in accord with the invention, FIG. 2 is a perspective view of the entire vehicle air spring in accord with the invention in the assembled form, FIG. 3 is an elevational, sectional, view of the air spring mounted upon the truck structure taken along section III—III of FIG. 1, and FIG. 4 is an elevational, rear, view of the vehicle air spring in accord with the invention, as taken from the right of FIG. 3, showing the axle in phantom lines.

The auxiliary spring unit in accord with the invention is of particular use and advantage with the front axle of trucks wherein the truck has extraordinarily high loads imposed on the front thereof. For instance, trucks having front mounted snowplow or bulldozer blades, or automobile transporting trucks having overcab ramps, may particularly employ the invention to advantage.

The environment of the invention as employed with a vehicle will be apparent from FIG. 1, wherein a truck having an overcab ramp is illustrated. The truck 10 includes frame and chassis structure upon which the bumper 12 is mounted and the vertical ramp support members 14 constitute the support for the overcab ramp. The truck structure also includes front steering wheels 16 mounted upon an axle 18 and conventional leaf spring structure 20 is interposed between the axle and frame for supporting the frame upon the axle. The auxiliary spring unit is located in front of the axle 18 and is mechanically interposed between the axle and the frame, as will be described later. The structure of the auxiliary spring unit does not extend below the frame beyond the lowermost portions of axle 18 and, thus, does not interfere with the normal truck road clearance. Also, the auxiliary spring member is so positioned upon the truck as to not interfere with the steering or the normal operation of the springs 20.

Referring to FIGS. 2 through 4, it will be noted that the auxiliary spring apparatus includes a pair of elongated upper and lower plates 22 and 24, respectively. The illustrated embodiments of the plates are of a channel configuration whereby the channels of the plates are located in opposed relation. The plates 22 and 24 are maintained in spaced parallel relation, and must be of such strength as to withstand the transverse forces imposed thereon without undue bending.

The upper plate 22 is provided with vehicle frame mounting brackets 26 affixed to the upper side thereof adjacent the plate ends. The brackets 26 include angular members 28, reinforced by webs, which may be bolted or welded to the upper plate 22, and each of the angular members 28 have bolted thereto an angle member 30 having holes 32 defined in a flange 34 thereof for mounting to the vehicle frame. Holes are defined in the other angular member flange 36 for receiving bolts 38 which interconnect the angular members 28 and 30 together, as shown in FIG. 2.

The lower plate 24 is provided with end plates 40 welded to the ends of the lower plate and disposed at right angles to the plate length. A pair of levers 42 are affixed to the end plates 40, a lever being associated with each end plate. The left end of the levers 42, FIG. 2, is provided with a transverse bore for receiving a pivot pin 44 which is mounted upon a bracket 46. The bracket 46 mounts an angular member 48 having holes 50 defined therein for attachment to vehicle frame structure, and a plurality of holes 52 may be defined in the bracket 46 and angle 48 whereby bolts 53 are used to adjustably position the angle 48 relative to the associated bracket 46.

The other end of the levers 42 is offset as at 54, and is provided with an abutment surface 56, adapted to rest on the top of the vehicle axle 18, as shown in FIG. 3. It will be noted that the end plates 40 are attached to the levers intermediate the ends thereof and adjacent the offset 54.

Air cushioning means are interposed between the plates 22 and 24, and in the illustrated embodiment the air cushioning means are formed by a plurality of inflatable resilient bag members 58 encircled by a coil spring 60 which confines the bag against undue radial expansion. Each of the bag members is confined within the ends of the associated coil by an end clip 62 having threaded studs 64 associated therewith for projecting through holes defined in the upper or lower plate for this purpose. Nuts 66 threaded upon the studs 64 affix the upper end clip 62 of the bag members to the upper plate and the lower end clip of the bag members to the lower plate.

The bag members 58 are provided with an air stem or inlet 68 extending through the side thereof whereby air may be introduced into or removed from the bag and the pressure thereby regulated. The above described inflatable bag member is similar to that described in United States Patent No. 2,710,184, and is commercially available.

Preferably, a manifold tube 70 is attached to one of the plates, usually the lower, having an air valve 72 in communication therewith wherein conduits 74 interconnect the air valves 68 to the manifold 70. Thus, upon charging the manifold 70 with the desired air pressure, equal pressures within all of the bag members will be assured and easily controlled.

Installation of the auxiliary spring unit is very simple in that only the drilling of several holes in the vehicle frame is required. As shown in FIGS. 1, 3, and 4, the vehicle frame includes primary longitudinally extending angle members 76, and each of the angle members 76 may be drilled with a pair of holes for receiving bolts 78 for attaching the angles 30 to the frame members 76 through holes 32. Likewise, the pivot bracket angle members 48 may be attached to the vehicle frame angles 76 by drilling a pair of holes for each angle 48 whereby bolts 80 may be employed to attach the angles 48 to the frame members 50. The bolts 38 may then be employed to attach the angles 30 to the members 28 and the bolts 53 are used to attach angles 48 to the brackets 46. The desired holes 52 are employed in attaching the angles 48 and brackets 46 whereby the levers 42 will be substantially parallel to the horizontal, as is apparent from FIG. 3. Prior to assembling the bracket angles as described above, the offset lever portion 54 is placed over the vehicle axle 18, as shown in FIG. 3. Thus, the levers 42 directly engage the axle 18 at spaced locations whereby the vertical movement of the axle during movement of the truck will be transmitted to the lower plate 24. As the axle moves toward and away from the vehicle frame as irregularities in the road surface are encountered, forces imposed on the axle will be cushioned from the frame by the bag members 58, thereby aiding the conventional springs 20 and significantly reducing fatigue and breakage thereof, and providing absorption of the forces imposed between the axle and vehicle frame.

The distribution of the weight carried by the front axle between the conventional leaf springs 20 and the auxiliary spring device is regulated by varying the air pressure within the bag members 58. Thus, the operator is able to easily adjust the auxiliary spring unit to produce the desired riding characteristics. The valve 72 may be connected to a conventional tire air chuck and the pressure within the bag members raised or lowered as desired. For instance, when the truck is empty usually a lower air pressure within the bag members will produce a smoother ride than the air pressure required for a fully loaded vehicle. Upon installing a suitable control valve structure within the vehicle cab, it would also be possible to attach the air valve 72 to the vehicle compressed air system for controlling the bag air pressure directly from the vehicle cab.

The simplicity of installing the mounting angles 30 and 48 and the fact that the levers 42 only need rest upon the axle 18 permits the described apparatus to be readily installed in a wide variety of vehicle makes. The adjustment produced by the holes 52 will compensate for variations in vehicle dimensions, and, if necessary, several sizes of brackets 26 and 46 may be furnished with each auxiliary spring device to accommodate extreme dimensional variations which may exist between different models or makes of vehicles.

As the movement of the lower plate 24 will be in an arc about the pivot axis of the pins 44, shifting of the lower plate relative to the upper plate, in a horizontal direction, is prevented. The axes of the pivot pins 44 coincide whereby no twisting of the lower plates will occur during the movement thereof, and the desired relationship between the upper and lower plates will be maintained.

It is understood that various modifications to the described embodiment may be apparent to those skilled in the art without departing from the spirit and scope thereof, and it is intended that the invention be defined only by the following claims.

I claim:

1. An auxiliary air spring attachment for vehicles having a wheel supported axle and frame members supported upon the axle by spring means comprising, in combination, an elongated upper plate affixed to the vehicle frame, a pair of spaced levers, coaxial pivot pins pivotally mounting said levers upon the vehicle frame, said pivot pins being spaced from said upper plate, an elongated lower plate connected to and interposed between said levers and spaced from said pivot pins, abutment means defined on said levers engaging and supported upon the vehicle axle and air cushion means interposed between said upper and lower plates.

2. In an auxiliary air spring attachment as in claim 1 wherein said air cushion means constitute a plurality of resilient inflatable bag members, an air inlet mounted upon each bag member, an air manifold mounted upon one of said plates having an air valve associated therewith and conduit means connecting said bag air inlets to said manifold.

3. An auxiliary vehicle air spring attachment comprising, in combination, an elongated upper plate having upper and lower sides and ends, vehicle frame mounting brackets affixed to said upper plate, an elongated bottom plate having an upper side and ends, said lower plate being disposed parallel to and spaced from said upper plate whereby the lower side of said upper plate is in opposed relation to the upper side of said lower plate, inflatable air cushion means interposed between the opposed sides of said plates, a pair of spaced levers affixed to said lower plate, lever mounting pivot means mounted upon each of said levers, a vehicle mounting bracket adapted to support each of said pivot means, the axes of the pivot means of said levers coinciding, and axle engageable abutment means defined on said levers spaced from said pivot means.

4. In an auxiliary vehicle air spring attachment as in claim 3, wherein a lever is affixed to each end of said lower plate and said upper plate mounting brackets are affixed to the upper side of said upper plate adjacent the ends thereof.

5. In an auxiliary vehicle air spring attachment as in claim 3, wherein said air cushion means comprises a plurality of inflatable resilient bag members having upper and lower portions, said upper portions being attached to said upper plate lower side and the lower portion being attached to said lower plate upper side.

6. In an auxiliary vehicle air spring attachment as in claim 5, wherein an air inlet is mounted on each of said bag members, a manifold affixed to one of said plates having an air valve communicating therewith and conduits establishing communication between the air inlets of said bag members and said manifold.

7. An auxiliary vehicle air spring attachment comprising, in combination, an elongated upper plate having upper and lower sides and ends, mounting brackets affixed to said upper plate, an elongated bottom plate having an upper side and ends, said lower plate being disposed parallel to and spaced from said upper plate whereby the lower side of said upper plate is in opposed relation to the upper side of said lower plate, inflatable air cushion means interposed between the opposed sides of said plates, a pair of spaced, parallel, levers affixed to said lower plate, pivot means mounted upon each of said levers spaced from said lower plate, the pivot means of said levers having a common pivot axis, a vehicle mounting bracket mounting each of said pivot means, and axle abutment means defined on said levers, said lower plate being interposed between said abutment and pivot means of said levers.

References Cited in the file of this patent
UNITED STATES PATENTS

| | | |
|---|---|---|
| 870,254 | Slater | Nov. 5, 1907 |
| 2,905,459 | Fikse | Sept. 22, 1959 |
| 2,988,378 | Davies | June 13, 1961 |
| 2,996,312 | Paul | Aug. 15, 1961 |